(12) United States Patent
Pautis et al.

(10) Patent No.: US 10,494,113 B2
(45) Date of Patent: Dec. 3, 2019

(54) AIRCRAFT ENGINE ASSEMBLY, COMPRISING AN ENGINE ATTACHMENT DEVICE EQUIPPED WITH STRUCTURAL MOVABLE COWLS CONNECTED TO THE CENTRAL BOX

(71) Applicant: Airbus Operations SAS, Toulouse (FR)

(72) Inventors: Olivier Pautis, Merville (FR); Laurent Lafont, Pechbusque (FR); Pascal Gougeon, Bouloc (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 521 days.

(21) Appl. No.: 15/437,698

(22) Filed: Feb. 21, 2017

(65) Prior Publication Data
US 2017/0240288 A1     Aug. 24, 2017

(30) Foreign Application Priority Data
Feb. 23, 2016  (FR) ...................... 16 51468

(51) Int. Cl.
*B64D 29/06*     (2006.01)
*B64D 27/26*     (2006.01)

(52) U.S. Cl.
CPC ............. *B64D 29/06* (2013.01); *B64D 27/26* (2013.01); *B64D 2027/264* (2013.01)

(58) Field of Classification Search
CPC ... B64D 29/06; B64D 27/26; B64D 2027/264
See application file for complete search history.

(56) References Cited

U.S. PATENT DOCUMENTS

| | | | | | |
|---|---|---|---|---|---|
| 4,471,609 | A | * | 9/1984 | Porter ................... | B64D 27/18 244/117 A |
| 4,679,750 | A | * | 7/1987 | Burhans ................ | B64D 29/06 244/129.4 |

(Continued)

FOREIGN PATENT DOCUMENTS

| FR | 2885878 | 11/2006 |
|---|---|---|
| FR | 3014841 | 6/2015 |

(Continued)

OTHER PUBLICATIONS

French Search Report, dated Oct. 27, 2016, priority document.

*Primary Examiner* — Philip J Bonzell
*Assistant Examiner* — Michael B. Kreiner
(74) *Attorney, Agent, or Firm* — Greer, Burns & Crain, Ltd.

(57) ABSTRACT

In order to reduce the size of the attachment arrangement between an aircraft engine and its attachment device, an engine assembly is provided for which the primary structure of the attachment device includes a central box and two movable structural cowls. Further the arrangement for attaching the engine on the structure comprises a group of main ties laid out in a main transverse plane for absorbing forces crossing a front end of the movable structural cowls, this group comprising three main shearing pins radially oriented and distributed around a longitudinal axis of the engine, each pin crossing a first shearing orifice provided on a fitting secured to the hub of the intermediate case on the one hand, and a second shearing orifice provided on one of the movable cowls or on its connecting structure to the central box on the other hand.

15 Claims, 10 Drawing Sheets

(56) References Cited

U.S. PATENT DOCUMENTS

| | | | |
|---|---|---|---|
| 4,683,717 A | 8/1987 | Naud | |
| 2006/0038065 A1 | 2/2006 | Howe et al. | |
| 2008/0191088 A1 | 8/2008 | Diochon et al. | |
| 2008/0210811 A1 | 9/2008 | Diochon et al. | |
| 2010/0040466 A1 | 2/2010 | Vauchel et al. | |
| 2013/0232768 A1* | 9/2013 | Suciu | F02C 7/20 29/525.01 |
| 2013/0243589 A1* | 9/2013 | Caruel | B64D 29/06 415/213.1 |
| 2014/0361119 A1 | 12/2014 | Badescu et al. | |
| 2015/0166192 A1 | 6/2015 | Ewens et al. | |
| 2016/0159487 A1 | 6/2016 | Kang et al. | |
| 2016/0201600 A1* | 7/2016 | Charron | B64D 29/00 239/265.19 |
| 2016/0340024 A1* | 11/2016 | Pautis | B64D 29/08 |
| 2017/0240287 A1* | 8/2017 | Oonishi | B64C 7/02 |
| 2017/0327240 A1* | 11/2017 | Kerbler | B64D 29/06 |
| 2018/0017020 A1* | 1/2018 | Howarth | F02K 1/1207 |

FOREIGN PATENT DOCUMENTS

| | | |
|---|---|---|
| GB | 2202588 | 9/1988 |
| WO | 2015010315 | 1/2015 |

\* cited by examiner

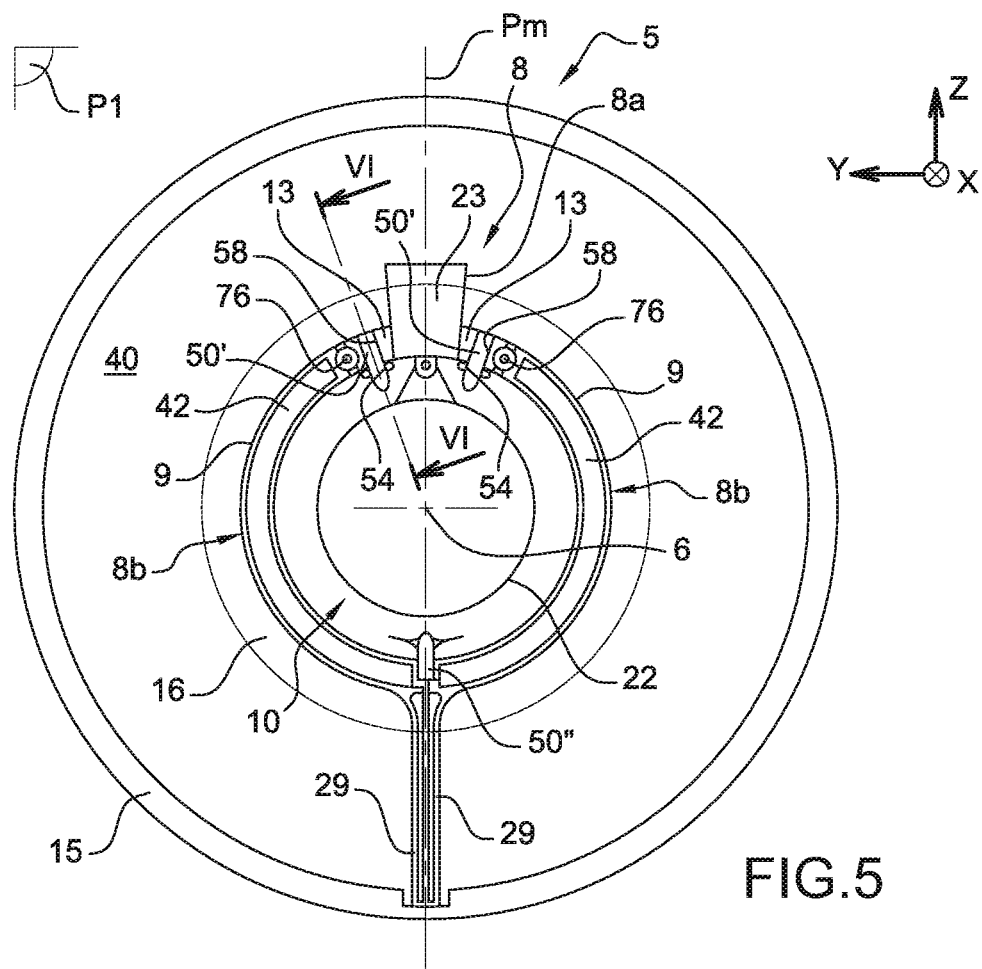
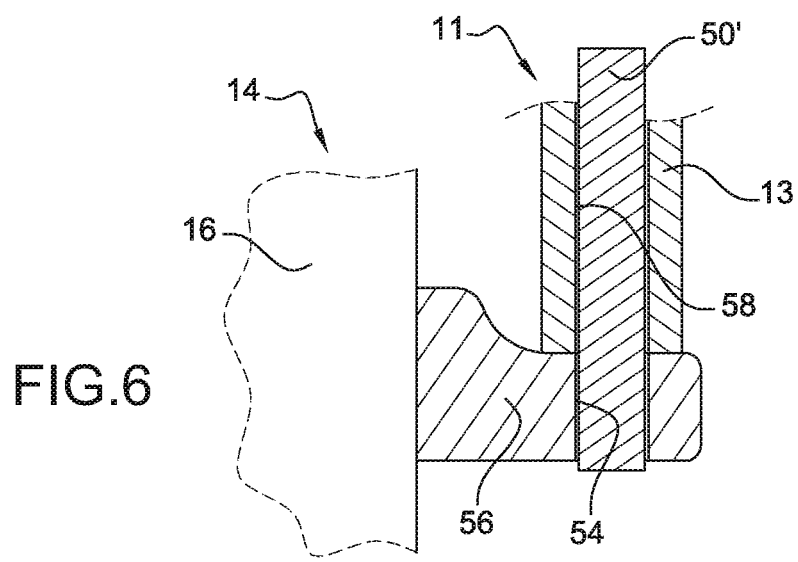

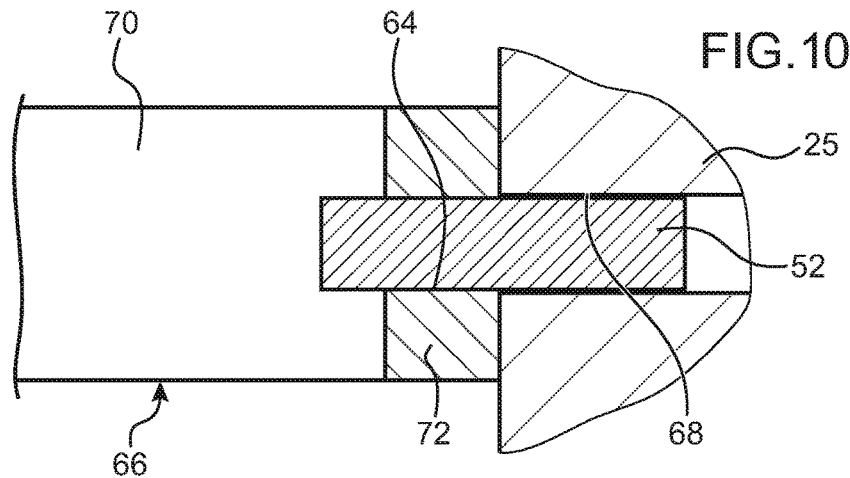
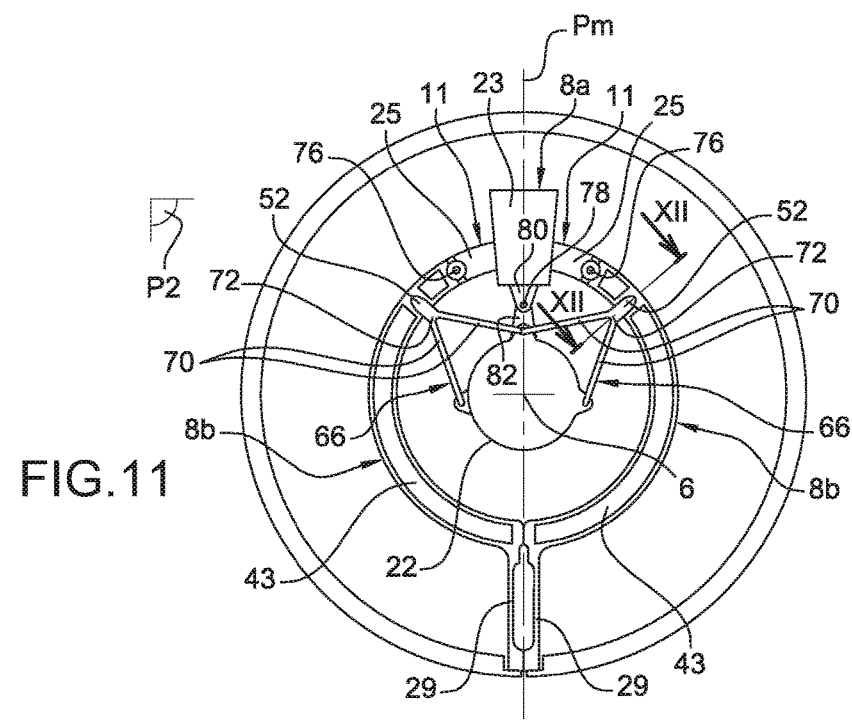
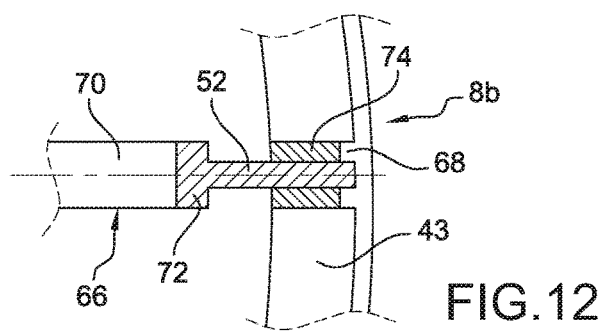

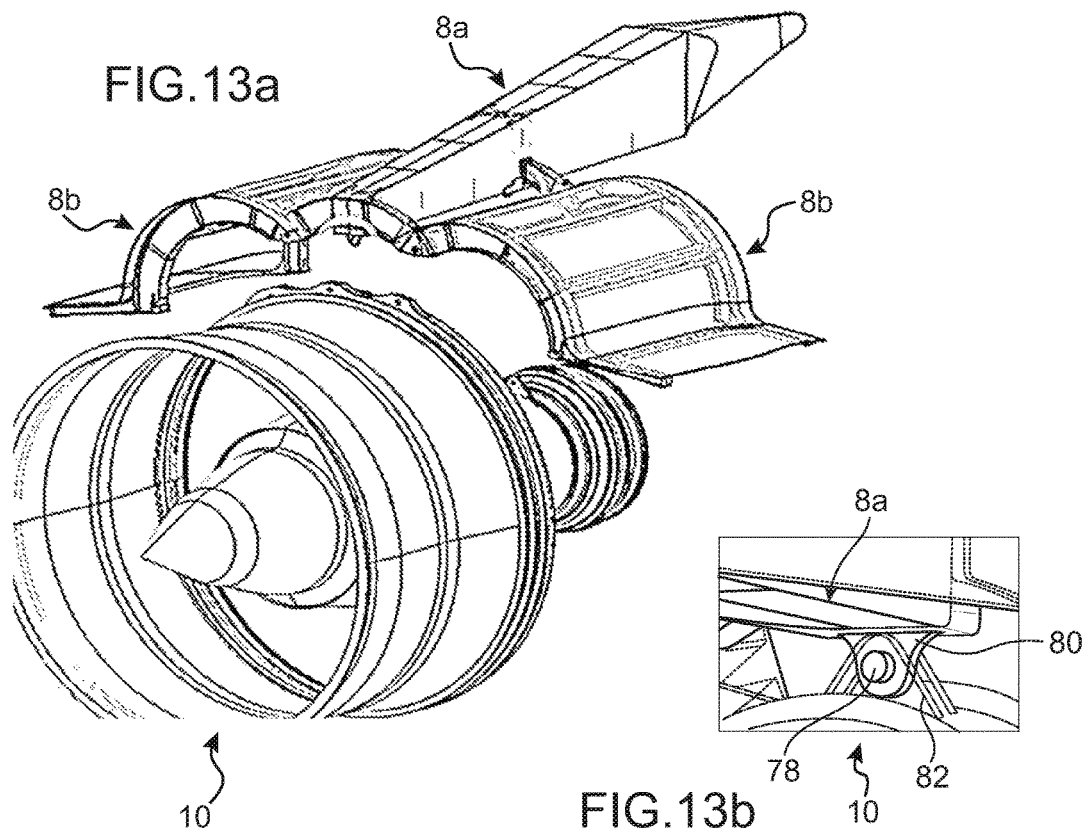
FIG.13a
FIG.13b
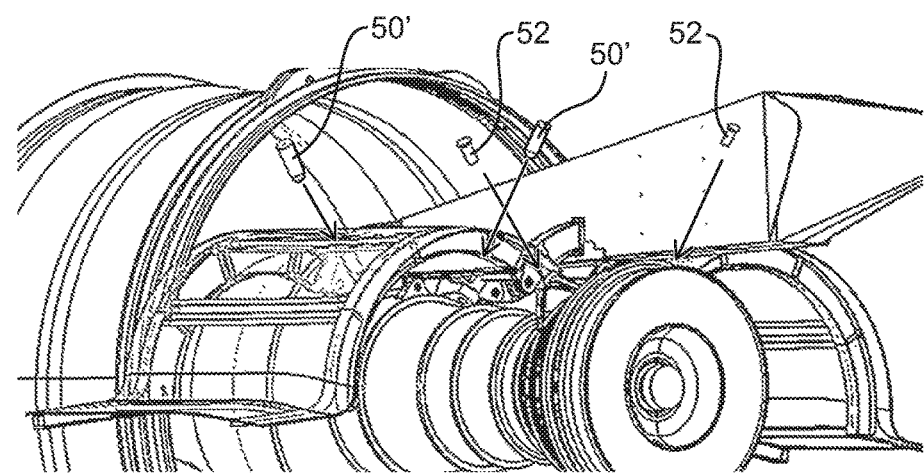
FIG.13c

AIRCRAFT ENGINE ASSEMBLY, COMPRISING AN ENGINE ATTACHMENT DEVICE EQUIPPED WITH STRUCTURAL MOVABLE COWLS CONNECTED TO THE CENTRAL BOX

CROSS-REFERENCES TO RELATED APPLICATIONS

This application claims the benefit of the French patent application No. 16 51468 filed on Feb. 23, 2016, the entire disclosures of which are incorporated herein by way of reference.

TECHNICAL FIELD

The present invention relates to the field of aircraft engine assemblies comprising a device for attaching the motor on a structure of the aircraft, preferably under a wing of this aircraft.

It applies preferentially to commercial airplanes.

BACKGROUND OF THE INVENTION

In existing aircraft, the engines such as double-flow and double-body jet engines, are suspended under the wings or added to the fuselage by complex attachment devices, also called EMS (engine mounting structure), or even attachment strut. The attachment struts usually employed have a rigid structure, called primary structure. This primary structure generally forms a box, that is to say that it consists of the assembly of bottom and top spars connected together by a plurality of transverse stiffening ribs, situated inside the box. The spars are arranged on the bottom and top faces, while lateral panels close the box on the lateral faces.

As is known, the primary structure of these attachment devices is designed to allow the transmission to the wings of the static and dynamic forces generated by the engines, such as the weight, the thrust, or even the different dynamic forces.

In the solutions known from the prior art, the transmission of the forces between the engine and the primary structure is conventionally ensured by attachment means consisting of a front engine tie, a rear engine tie and a device for absorbing the thrust forces. These elements together form an isostatic tie system.

Usually, the front engine tie is fixed to the outer shell of an intermediate case or onto the fan case, as is disclosed in the document FR 3 014 841. Alternatively, this front engine tie can be added to the hub of the intermediate case, linked by radial arms to the above mentioned outer shell. For its part, the rear engine tie connects the primary structure to the engine exhaust case, situated at the rear end of this engine.

With this type of configuration, forces of high intensity have to be absorbed by the rear engine tie, in particular the forces linked to the torsional moment. To ensure the absorption of these significant forces, the rear engine tie usually has a significant bulk, particularly in the transverse direction. This strong bulk can, for example, be reflected by the presence of local protuberances at the two lateral ends of the rear engine tie. This causes, in the secondary jet, aerodynamic disturbances which are detrimental to the overall performance of the engine. Furthermore, it results in an over dimensioning of the surrounding aerodynamic fairings, such as the rear aerodynamic fairing (or Aft Pylon Fairing, APF), the width of which has to be adapted accordingly. These over dimensionings of the surrounding fairings also cause drag.

SUMMARY OF THE INVENTION

An aim of the invention is therefore to propose an aircraft engine assembly that at least partially remedies the above-mentioned problems, encountered in the prior art solutions.

For this, the subject of the invention is an aircraft engine assembly comprising:
- a double-flow engine comprising an intermediate case comprising a hub, an outer shell and radial arms connecting the hub to the outer shell;
- a device for attaching the engine to a structure of the aircraft, the attachment device comprising a primary structure equipped with a central box;
- an arrangement for attaching the engine to the primary structure of the attachment strut.

According to the invention, the primary structure also comprises two movable structural cowls each comprising an outer skin internally delimiting a secondary annular jet of the engine, each movable cowl comprising a proximal end articulated on a connecting structure connecting the movable cowl to the central box, and a distal end cooperating with the distal end of the other movable cowl, the movable structural cowls being laid out in continuity behind the intermediate case hub.

Furthermore, the attachment arrangement comprises a group of main ties laid out in a main transverse plane for absorbing forces crossing a front end of the movable structural cowls, the group of main ties comprising three main shearing pins radially oriented and distributed around a longitudinal axis of the engine, each main shearing pin crossing a first shearing orifice provided on a fitting secured to the hub of the intermediate case, and a second shearing orifice provided on one of the movable cowls or on its connecting structure.

The invention is thus noteworthy in that it provides main ties in the form of three shearing pins distributed around the longitudinal axis of the engine, between the intermediate case, and the movable structural cowls and/or their connecting structure. The three radially oriented shearing pins alone make it possible to form an isostatic system for absorbing forces, within which most of the forces originating from the engine are absorbed, as close as possible to the center of gravity thereof.

Because of this, in the preferred embodiment in which secondary ties complement the main ties by being, for example, situated more towards the rear, these secondary ties are largely relieved of load by absorbing only the inertial loading of the central case of the engine. They can, because of this, have a smaller bulk than in the prior art. By virtue of this reduction of bulk, the secondary airflow is less disturbed in the secondary jet, which improves the overall performance of the engine. The surrounding aerodynamic fairings can also have a reduced bulk, with a positive consequential reduction of the drag and of their weight.

As emerges from the above, the invention also provides for incorporating, in the primary structure, the two movable cowls each comprising an outer skin. This outer skin, usually called IFS ("Inner Fixed Structure" or even "Inner Fan Structure"), is therefore shrewdly incorporated in the primary structure to fulfil a working skin function therein, by virtue of which there is no longer a need to implement lateral links for absorbing the thrust forces as are encountered in the prior art.

The invention can also have at least one of the following additional features, taken alone or in combination.

Each movable structural cowl comprises a front frame supporting the outer skin, and the second shearing orifice is preferably produced in the front frame.

Alternatively, each connecting structure comprises a front framework protruding laterally from the central box, and the second shearing orifice is preferentially produced in the front framework.

In the latter case, the two front frameworks, associated respectively with the two movable cowls, are secured to a transverse stiffening rib of the central box and produced of a single piece with this rib, the latter preferably constituting a front closing rib of the central box.

Preferably, one of the three main shearing pins, called a bottom shearing pin, is arranged diametrically opposite relative to the central box, and the two other main shearing pins, called top shearing pins, are arranged symmetrically relative to a median plane of the engine assembly crossing the central box and the bottom shearing pin.

Preferably, the three main shearing pins are arranged substantially at 120° relative to one another.

As stated previously, the attachment arrangement comprises a group of secondary ties laid out in a secondary transverse plane for absorbing forces crossing a rear end of the movable structural cowls, the group of secondary ties comprising two secondary shearing pins radially oriented and spaced apart circumferentially from one another. Preferably, each secondary shearing pin crosses a third shearing orifice provided on a fitting secured to a case element of the engine, and a fourth shearing orifice provided on one of the movable cowls or on its connecting structure. Alternatively, the secondary shearing pin could be secured to one of the above-mentioned two elements, and cooperate with a shearing orifice provided in the other element.

Preferably, each movable structural cowl comprises a rear frame supporting the outer skin, and the fourth shearing orifice is preferentially produced in the rear frame.

Alternatively, each connecting structure comprises a rear framework protruding laterally from the central box, and the fourth shearing orifice is preferentially produced in the rear framework.

In the latter case, the two rear frameworks associated respectively with the two movable cowls are secured to an inner transverse stiffening rib of the central box, and produced of a single piece with this inner rib.

Preferably, the fitting secured to the case element of the engine comprises two cross members, each oriented substantially tangentially relative to the case element, the fitting also comprising a plate toward which the two cross members converge, the secondary shearing pin cooperating with the plate.

Preferably, the engine assembly comprises removable fixing means ensuring the fixing, to one another, of the two distal ends of the movable structural cowls. These removable fixing means are, for example, bolts and/or shearing pins.

Preferably, the attachment arrangement also comprises shearing pins that are inactive in normal conditions of operation of the assembly. These pins can also ensure a so-called "fail safe" safety function in case of damage to the main shearing pins, and/or allow a temporary fixing of the engine to the attachment strut, during the operations of mounting this engine on the primary structure.

As stated previously, the attachment arrangement has no lateral links for absorbing thrust forces.

Finally, another subject of the invention is an aircraft comprising at least one such engine assembly, preferably fixed under a wing of this aircraft or on the fuselage thereof.

Other advantages and features of the invention will become apparent from the nonlimiting detailed description below.

BRIEF DESCRIPTION OF THE DRAWINGS

This description will be given in light of the attached drawings in which:

FIG. 5 is a schematic view in transverse cross section of the engine assembly shown in the preceding figures, taken on the cutting plane P1 of FIGS. 3 and 4;

FIG. 6 is a cross-sectional view taken along the line VI-VI of FIG. 5;

FIG. 10 is a cross-sectional view taken along the line X-X of FIG. 9;

FIG. 11 is a transverse cross-sectional view showing a different arrangement for the secondary shearing pins;

FIG. 12 is a cross-sectional view taken along the line XII-XII of FIG. 11;

FIGS. 13a to 13e are schematic perspective views representing a method for assembling the engine on the attachment device.

DETAILED DESCRIPTION OF THE PREFERRED EMBODIMENTS

Figure 14:
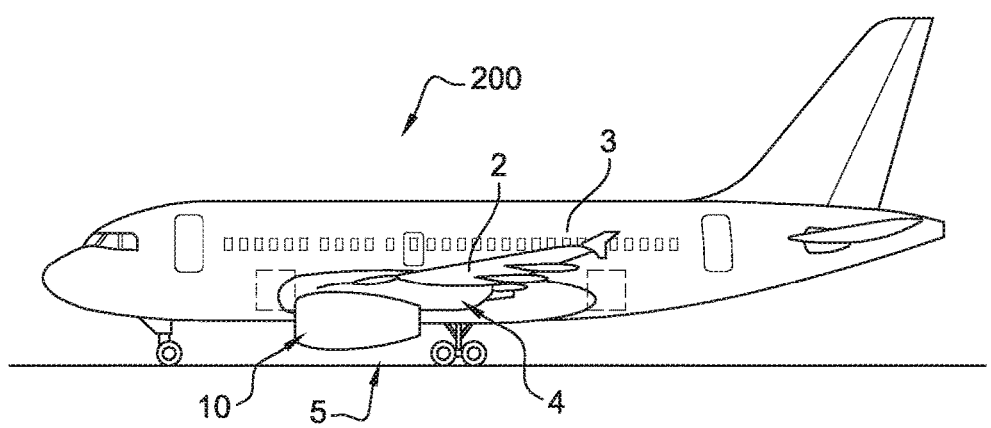
FIG. 14 represents a side view of an aircraft comprising several engine assemblies such as those shown in the preceding figures.

Referring to FIG. 14, an aircraft 200 is represented comprising a fuselage 3 on which are fixed two wing elements 2 (only one is visible in FIG. 11), each wing element bearing an engine assembly 5 according to the invention. This engine assembly 5 comprises a double-flow, double-body engine 10, such as a jet engine, and a device 4 for attaching the engine 10, also called an attachment strut. Conventionally, the engine assembly 5 is suspended under its wing 2.

Figure 1:
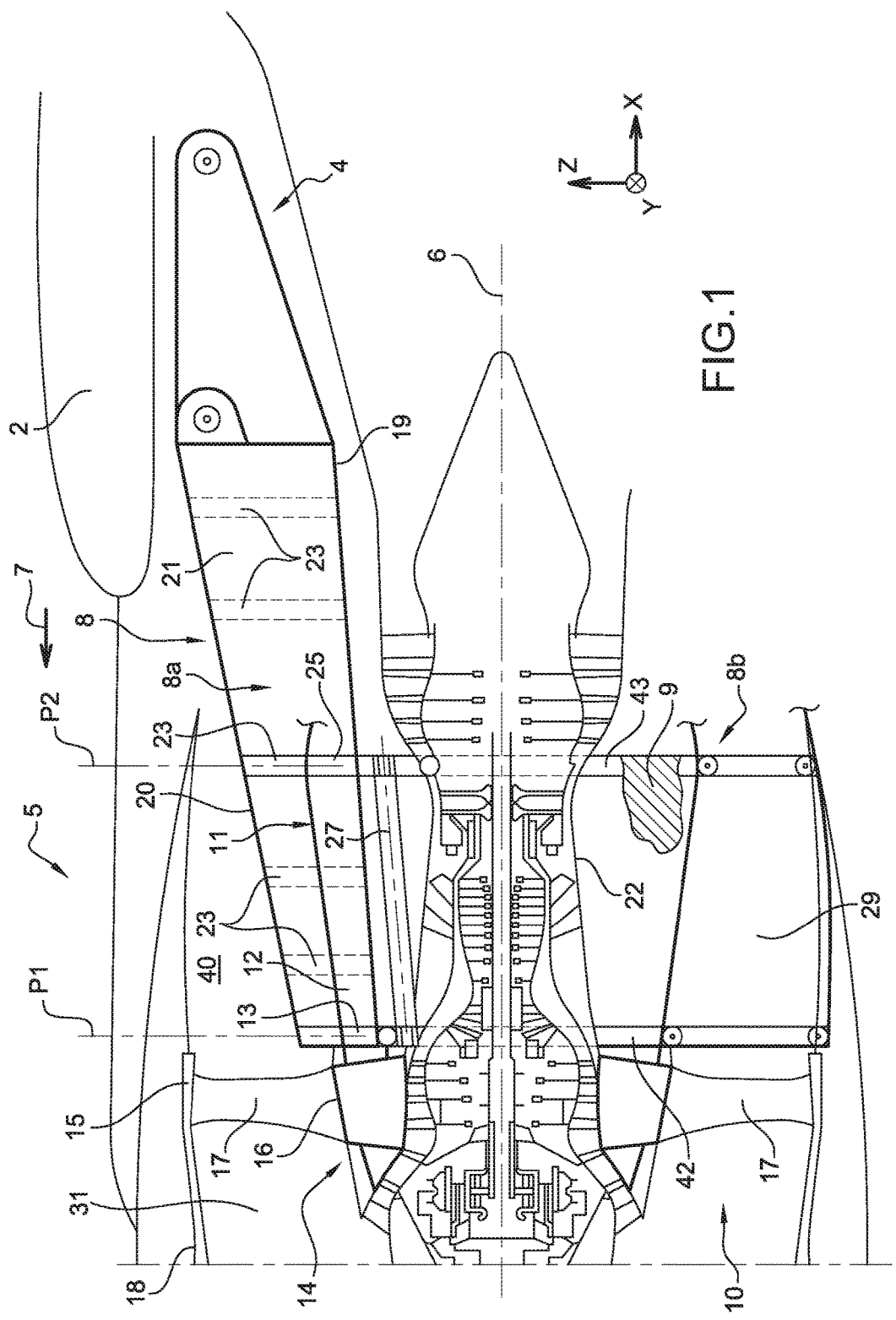
FIG. 1 represents a schematic view in longitudinal cross section of an engine assembly according to the invention.
Figure 2A:
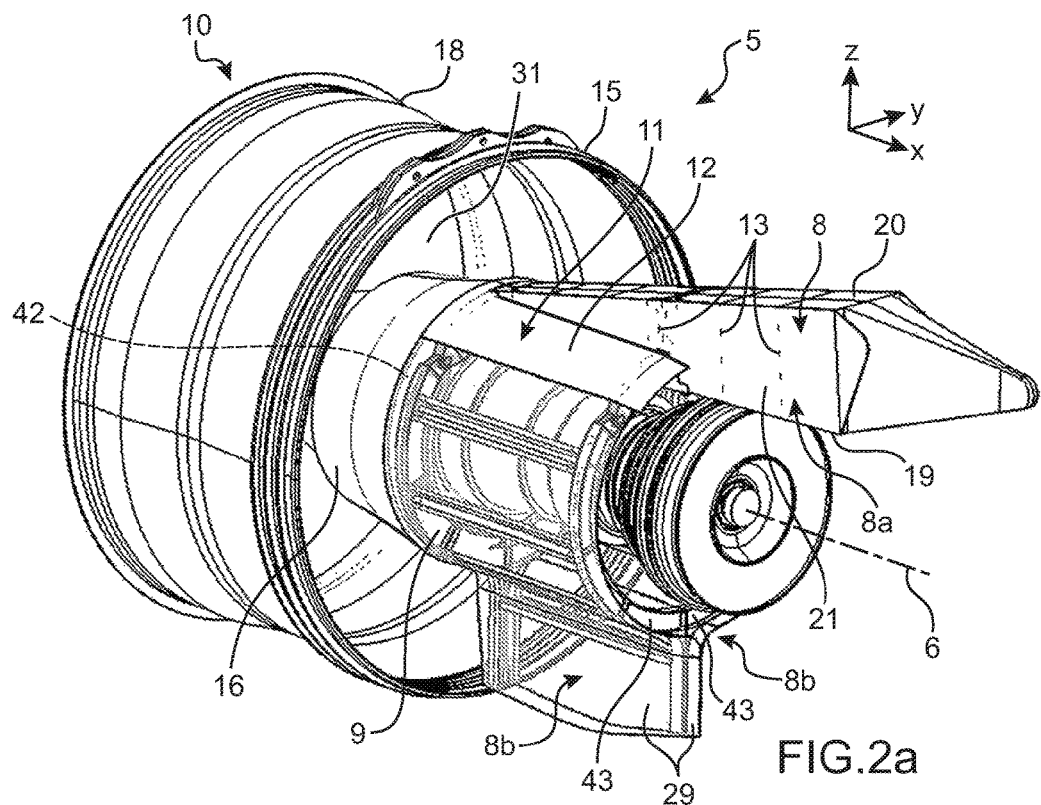
FIGS. 2a and 2b represent perspective views of the engine assembly shown in the preceding figure, respectively with its movable structural cowls in closed position and in open position.
Figure 2B:
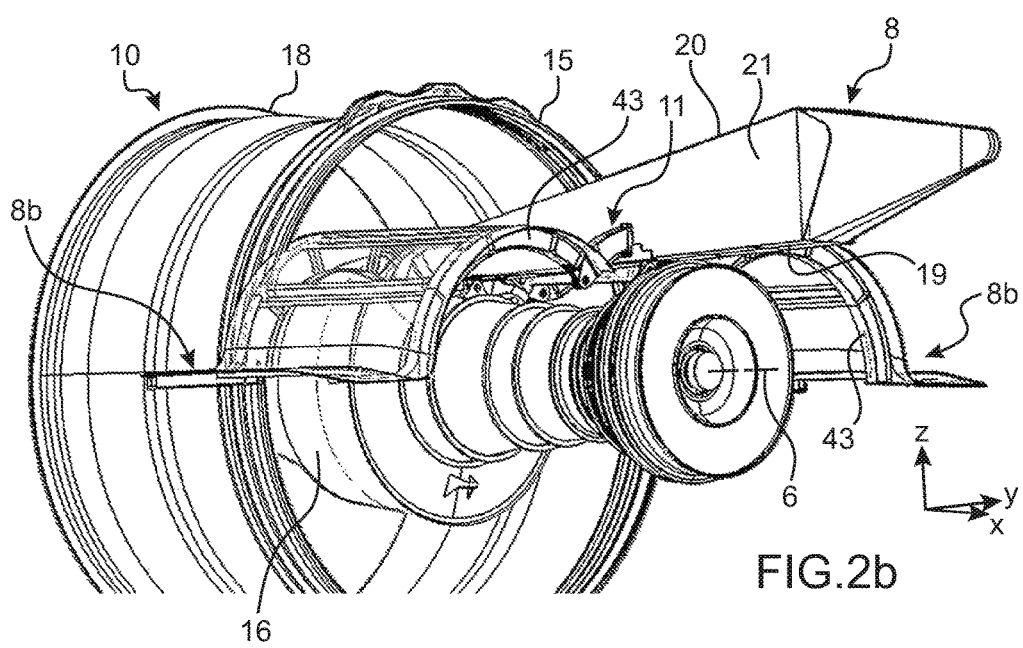
Figure 3:
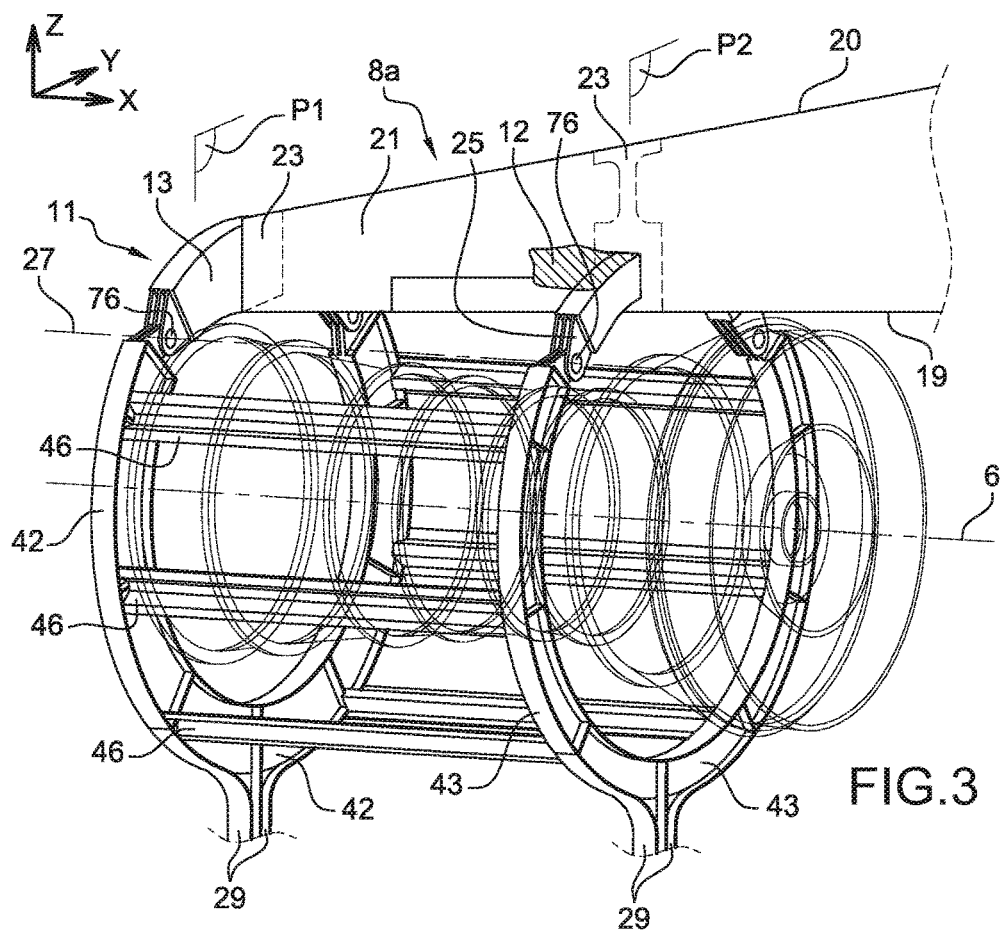
FIG. 3 represents a perspective view of a part of the primary structure of the attachment device with which the engine assembly shown in the preceding figures is equipped.

Referring to FIG. 1, one of the engine assemblies 5 is represented, fixed under its wing 2. The assembly 5 is intended to be surrounded by a nacelle (not represented), and the attachment device 4 comprises a series of ties (not referenced) added to the rigid structure 8 and making it possible to ensure the suspension of this assembly 5 under the wing 2 of the aircraft.

Throughout the following description, by convention, the direction X corresponds to the longitudinal direction of the device 4 which can also be likened to the longitudinal direction of the jet engine 10 and to that of the engine assembly 5, this direction X being parallel to a longitudinal axis 6 of this jet engine 10. Also, the direction Y corresponds to the direction oriented transversely relative to the device 4 and can also be likened to the transverse direction of the jet engine and to that of the engine assembly 5, and the direction Z corresponds to the vertical or heightwise direction, these three directions X, Y and Z being mutually orthogonal.

Also, the terms "front" and "rear" should be considered relative to a direction of advance of the aircraft encountered as a result of the thrust exerted by the jet engines 10, this direction being represented schematically by the arrow 7.

In FIGS. 1 to 4, the primary structure 8 of the attachment device 4 is represented, as are the secondary structures added to the primary structure 8. These secondary structures ensure that the systems are segregated and held, while supporting aerodynamic fairing elements. They will not be described further in the present description.

The jet engine 10 has, at the front, a fan case 18 of large dimension, delimiting an annular fan channel 31. It comprises, to the rear, a central case 22 of smaller dimension, enclosing the core of this jet engine. The cases 18 and 22 are secured to one another, through an intermediate case 14. The latter comprises an outer shell 15 which is situated in the rear extension of the fan case 18. This intermediate case 14 also comprises a hub 16, and radial arms 17 connecting the hub 16 to the outer shell 15. As an indication, it is specified that the hub 16 is also called an "inner shell" of the intermediate case 14.

The primary structure 8 of the attachment device 4 adopts a form specific to the present invention. It comprises, first of all, a central box 8a extending from the rear to the front, substantially in the direction X. The central box 8a then takes the form of a strut of a design similar to that usually observed for the jet engine attachment struts, notably in as much as it is provided with transverse stiffening ribs 23 each taking the form of a rectangle oriented in a plane YZ. Around these ribs 23, the central box conventionally comprises a bottom spar 19, a top spar 20 and two lateral panels 21 (only one visible in FIG. 1). Each of these elements 19, 20, 21 can be produced of a single piece, or else using elements added to one another.

One of the particular features of the invention lies in the fact that the rigid structure 8 also comprises a structural enclosure centered on the longitudinal axis 6 of the jet engine 10, this enclosure being globally of annular form and fixedly connected to the central box 8a. This enclosure, which extends only along a front part of the central box 8a, is produced using two movable structural cowls 8b, each extending over substantially 180° around the axis 6, or else over a slightly smaller angular segment. The movable nature of the cowls 8b makes it possible to simplify access to the jet engine and to the equipment thereof, during maintenance operations.

Each movable structural cowl 8b comprises an outer skin 9 internally delimiting a secondary annular jet 40 of the jet engine 10, this jet being situated in continuity of the annular fan channel 31. This skin 9, also called IFS ("Inner Fixed Structure"), is thus shrewdly made to work to contribute to the transmission of the forces from the engine to the wing.

Each movable cowl 8b is connected laterally to the central box 8a by a connecting structure 11 comprising a working skin 12 flush with the associated lateral panel 21, and participating also in the delimiting of the secondary annular jet 40. To support this skin 12, the connecting structure 11 comprises a front framework 13 protruding laterally from the lateral panel 21. Here, the two front frameworks 13 are arranged laterally on either side of a transverse stiffening rib 23 serving as a front closure of the central box 8a, as can be seen better in FIG. 4. Furthermore, these three elements 13, 23, 13 are preferably produced of a single piece.

Similarly, to support the working skin 12, the connecting structure 11 comprises a rear framework 25 protruding laterally from the lateral panel 21, this framework 25 being offset to the rear of the front framework 13 in the direction X. The two rear frameworks 25 are thus arranged laterally on either side of an inner transverse stiffening rib 23, as can be seen better in FIG. 4. Furthermore, these three elements 25, 23, 25 are preferably produced of a single piece.

On each side of the central box 8a, the connecting structures 11 serve as articulation for the movable structural cowls 8b, on their proximal end, also called a top end. For this, hinges 76 are interposed at the junction between the proximal ends of the cowls 8b, and the distal ends of the front and rear frameworks 13, 25. These hinges 76 define, two-by-two, lines of articulation of the cowls 8b, one of these lines 27 having been represented in FIGS. 1 and 3.

At their distal end, also called a bottom end, the movable cowls 8b cooperate with one another in a way which will be described herein below. The two distal ends are terminated by two substantially planar portions 29 extending radially into the secondary jet 40, these two portions 29 being in surface contact with one another.

The movable structural cowls 8b are arranged in rear continuity of the hub 16 of the intermediate case. Consequently, the front end of each cowl 8b is adjacent to this hub 16, and, more specifically, each cowl front end comprises a front frame 42 following the profile of its associated cowl, and arranged in rear continuity of the hub. The front frame 42 externally supports the skin 9. It extends between the articulation hinge 76 borne by the front framework 13, and the planar portion 29 situated at the bottom end.

Similarly, the movable structural cowls 8b each have a rear end which comprises a rear frame 43, also following the profile of its associated cowl. The rear frame 43 externally supports the skin 9. It extends between the articulation hinge 76 borne by the rear framework 25, and the planar portion 29 situated at the bottom end. Spars 46 oriented in the direction X connect the front frame 42 and the rear frame 43 of each movable cowl 8b.

The front frame 42 of each movable cowl 8b is located facing an inter-compressor zone, namely between a low-pressure compressor and a high-pressure compressor of the jet engine 10. The rear frame 43, for its part, is located facing an inter-turbine zone, namely between a high-pressure turbine and a low-pressure turbine of the jet engine 10.

The structural enclosure formed by the cowls 8b and the connecting structures 11 thus takes the overall form of a barrel or a cylinder, centered on the longitudinal axis 6. It is what is provided to bear the arrangement for attaching the jet engine 10 on the primary structure 8, as will be detailed herein below with reference to the following figures.

As stated previously, it is noted that the attachment strut comprises conventional secondary structures, of forms identical or similar to those encountered in the prior art, and known to those skilled in the art. The dimensioning of some of these fairings can nevertheless be reduced by virtue of the particular design of the attachment arrangement and of the rigid structure, in particular the rear aerodynamic fairing (not represented), the width of which in the direction Y can be reduced.

The attachment arrangement will now be described, with reference to FIGS. 4 to 12. This arrangement is preferentially distributed in two distinct planes axially spaced apart from one another, namely a main transverse plane P1 for absorbing forces crossing the front end of the cowls 8*b* and their front frame 42, and a secondary transverse plane P2 for absorbing forces crossing the rear end of the cowls 8*b*, and their rear frame 43.

Figure 4:
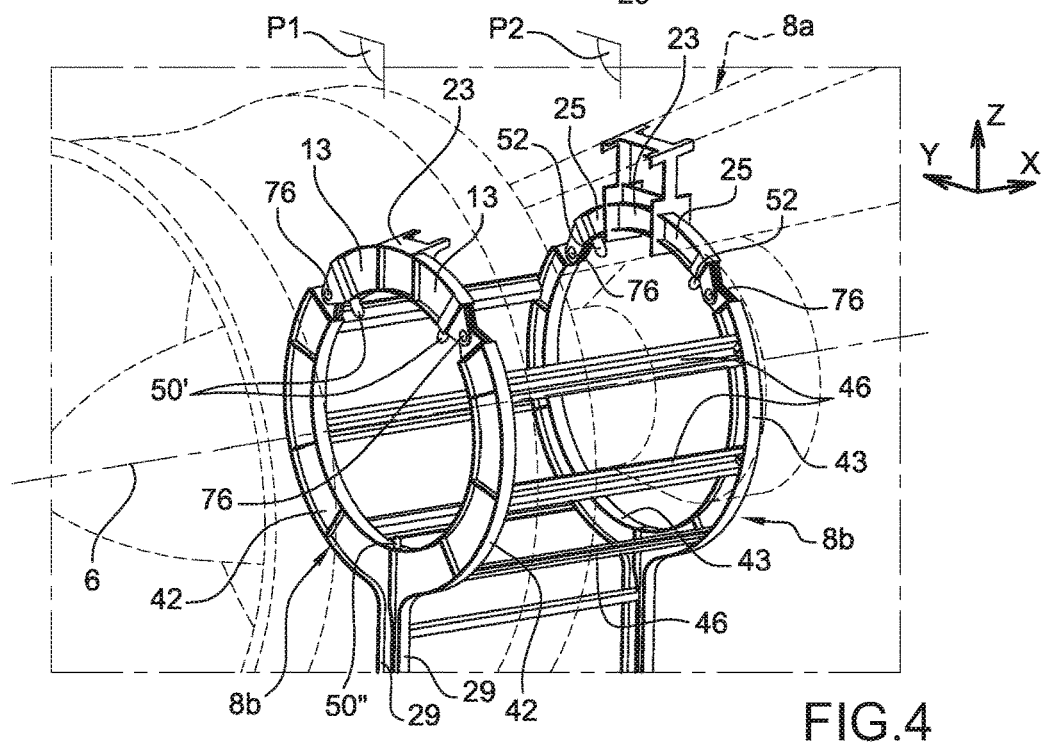
FIG. 4 is a perspective view similar to that of FIG. 3, from another viewing angle.

Referring more specifically to FIG. 4, a group of main ties (engine mounts) is provided in the main plane P1, these ties comprising three main shearing pins 50', 50". These pins 50 are laid out radially and distributed around the longitudinal axis 6. Furthermore, in the secondary plane P2, a group of secondary ties is provided, comprising two secondary shearing pins 52. These pins 52 are laid out radially and spaced apart circumferentially from one another, in the top part of the cowls 8*b*.

It is noted that the three main pins 50', 50" on their own make it possible to form an isostatic force absorption system. However, with the secondary pins 52 situated in the plane P2, the system of ties becomes hyperstatic, but most of the forces are still absorbed by the main pins 50', 50" situated as close as possible to the center of gravity of the engine. The function of the secondary pins 52 is principally, even exclusively, to absorb the forces of internal deformation of the central case 22 of the jet engine 10. The disturbances of the secondary flow are consequently very much reduced in the secondary plane P2, which improves the overall efficiency of the jet engine. In this respect, it is noted that the attachment arrangement preferably consists only of the above-mentioned means 50', 50", 52, meaning that no other engine tie is provided downstream of the secondary plane P2. In particular, the invention no longer requires lateral links for absorbing thrust forces such as those encountered in the conventional solutions, since these thrust forces are essentially absorbed by the three main pins 50', 50".

Furthermore, by shrewdly providing the main ties all around the longitudinal axis of the engine and in the plane P1, the flexural deformations of the engine are largely reduced. The plays at the ends of the turbine and compressor blades can thus be reduced, to obtain an increased efficiency with the lowering of fuel consumption.

Now referring more specifically to FIGS. 5 and 6, the two main shearing pins 50', called top shearing pins, will now be described. They are laid out symmetrically relative to a median plane XZ of the engine assembly, this plane being referenced Pm. This plane Pm crosses the main box 8*a* at its center, and the third pin 50", called a bottom shearing pin, and arranged diametrically opposite the central box 8*a*. In other words, in a clock reference frame centered on the axis 6 with the 12 o'clock position occupied by the central box 8*a*, the third pin 50" is arranged in the 6 o'clock position. The two top pins 50' are, for example, situated close to the 11 o'clock and 1 o'clock positions. Nevertheless, a uniform distribution, in which the pins 50', 50" are arranged substantially at 120° relative to one another, is also possible.

In the example of FIGS. 5 and 6, each top shearing pin 50' first of all crosses a first shearing orifice 54 provided on a fitting 56, secured to the hub 16 of the intermediate casing and projecting axially toward the rear from this hub. The pin 50' also crosses a second shearing orifice 58 provided on the front framework 13 of the connecting structure 11. The two orifices 54, 58 are therefore superposed and aligned in the radial direction, in order to receive the pin 50' and hold it in position using conventional means (not represented).

Figure 7:
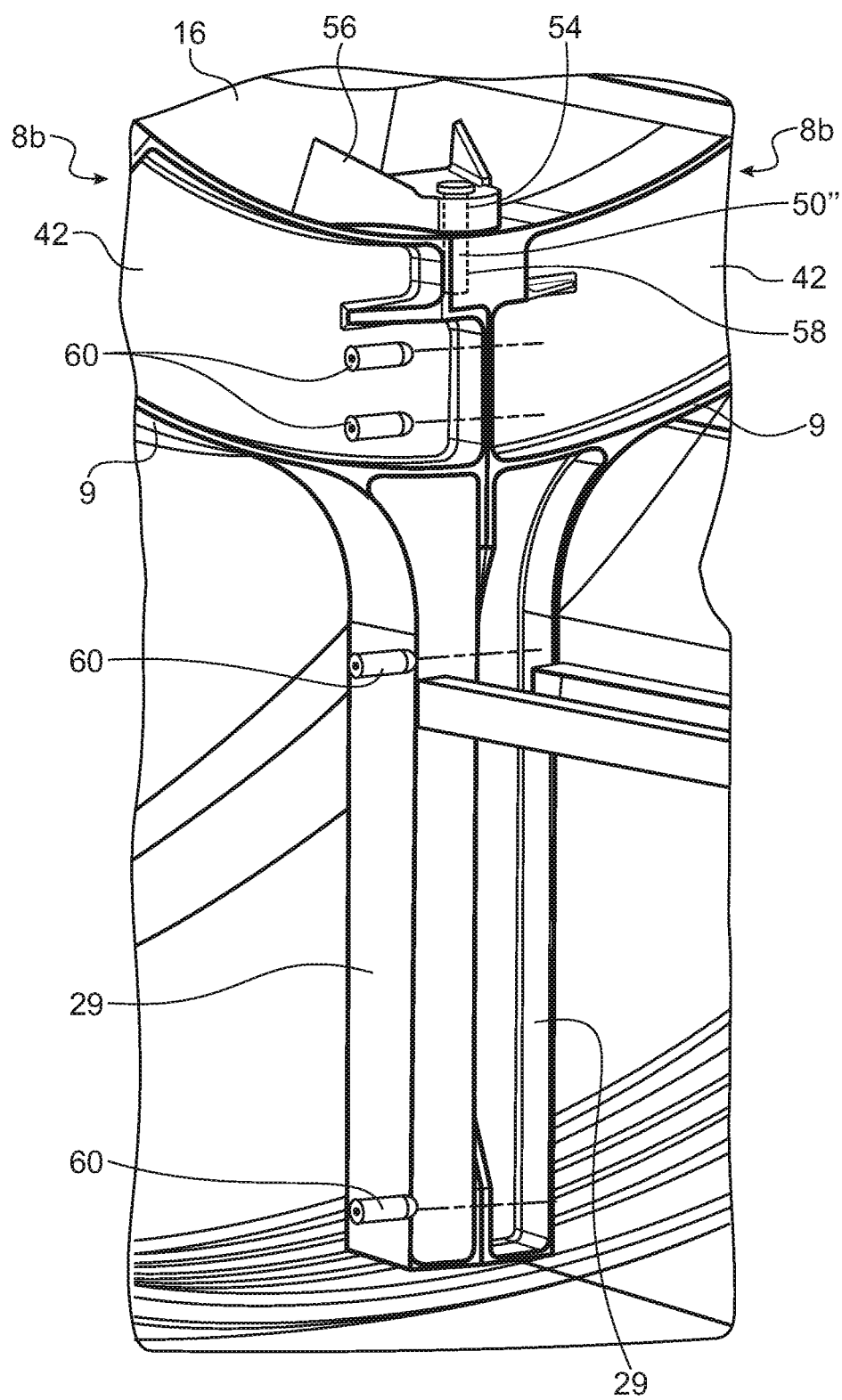
FIG. 7 is an enlarged perspective view of the junction between the two distal ends of the two movable structural cowls.

For the bottom shearing pin 50" shown in FIGS. 5 and 7, the latter is received in a first shearing orifice 54 provided on a fitting 56 secured to the hub 16 and projecting axially toward the rear from this hub. It is also received in a second shearing orifice 58 provided on one of the two front frames 42, at the internal end of the plane portions 29. Here also, the two orifices 54, 58 are superposed and aligned in the radial direction, in order to receive the pin 50" and hold it in position using conventional elements (not represented).

Referring to FIG. 7, it is noted that the engine assembly also comprises removable fixing elements, ensuring the fixing of the two distal ends of the movable cowls 8*b*. These ends are fixed to one another using fixing elements which, for example, take the form of bolts 60 and/or shearing pins. These removable fixing elements 60, arranged transversely, connect the two front frames 42 together as is shown in FIG. 7. A similar removable fixing (not represented) is produced between the two rear frames 43. The removable fixing elements 60 are distributed along the planar portions 29, up to close to the bottom junction pin 50".

Figure 8:
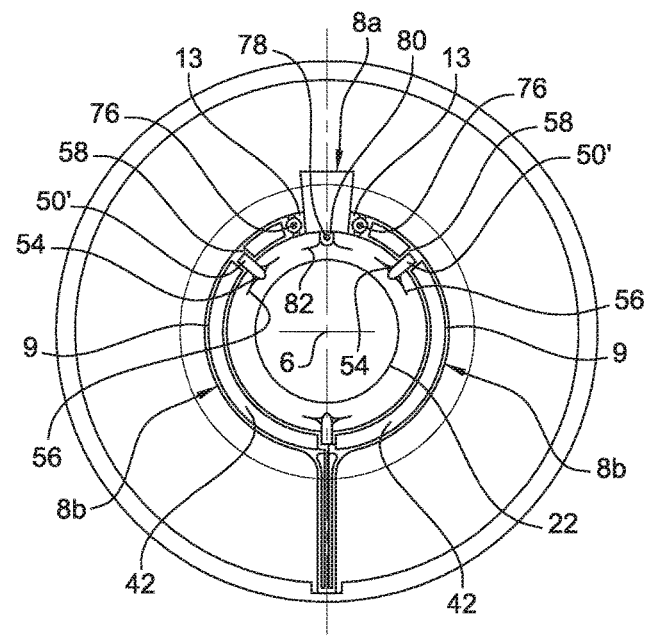
FIG. 8 is a view similar to that of FIG. 5, with the main shearing pins arranged differently.

Referring to FIG. 8, an alternative embodiment is represented in which the top shearing pins 50' no longer cooperate with the front frameworks 13 which adopt a reduced circumferential length, but they are now housed in the second orifices 58 formed in the front frames 42. This alternative makes it possible to more easily envisage a 120° spacing of the three shearing pins 50', 50" in the plane P1.

Figure 9:
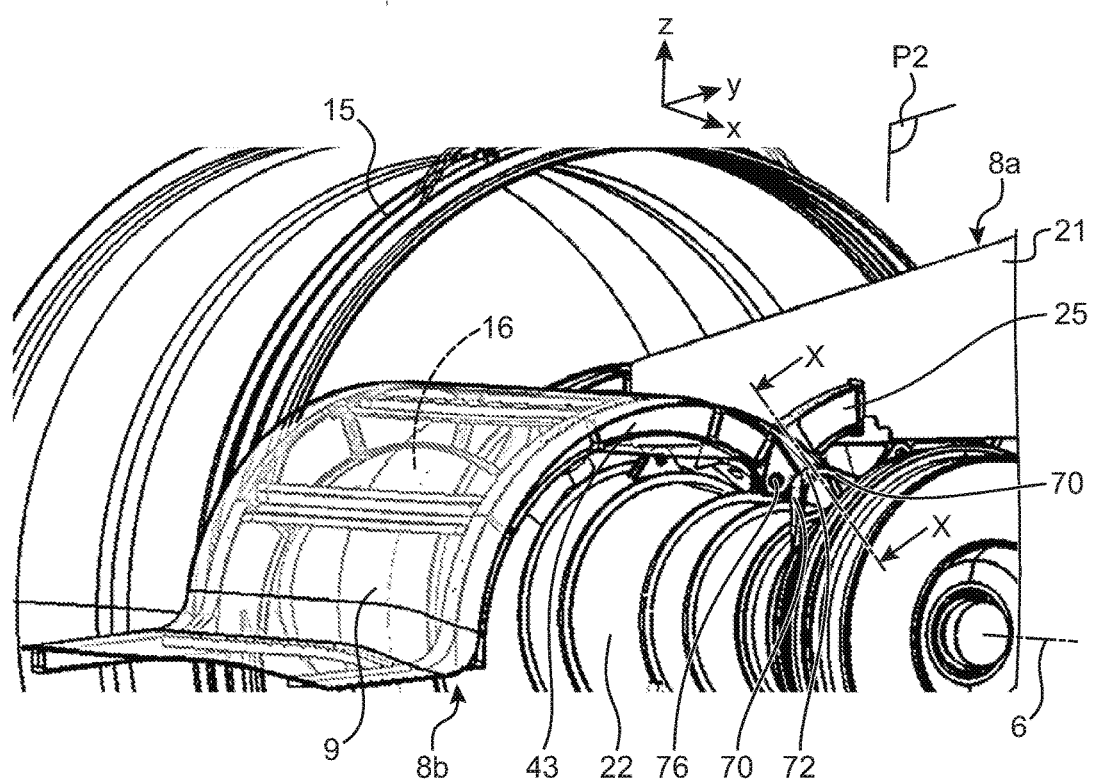
FIG. 9 is a perspective view of a part of the engine assembly shown in the preceding figures, showing in particular one of the secondary shearing pins.

Now referring to FIGS. 9 and 10, the two secondary shearing pins 52 (only one visible in these figures), each of which crosses a third shearing orifice 64 provided on a fitting 66 secured to the central case 22, are described. The two pins 52 are arranged symmetrically relative to the median plane Pm, in proximity to the central box 8*a*. Each pin 52 also crosses a fourth shearing orifice 68 provided on the rear framework 25 of the connecting structure. The two orifices 64, 68 are therefore superposed and aligned in the radial direction, in order to receive the pin 52 and hold it in position using conventional elements (not represented). More specifically, the fitting 66 here takes the form of a V with the point oriented radially outward. For this, it comprises two cross members 70, each oriented substantially tangentially relative to the central case 22 to which these two cross members 70 are secured, for example by being articulated on this case. The fitting 66 also comprises a plate 72 toward which the two cross members 70 converge, the plate 72 thus corresponding to the flattened point of the V. It is through the plate 72 that the fourth shearing orifice 68, in which the secondary shearing pin 52 is housed, is produced.

FIGS. 11 and 12 represent an alternative embodiment with two differences compared to the preceding embodiment. The first difference lies in the shearing pin 52, which is secured to the plate 72 instead of crossing an orifice formed in this plate. The second difference comprises providing the fourth orifice 68 no longer in the connecting structure, but in the cowl 8*b*, and more specifically in its rear frame 43. Nevertheless, only one of the two differences could be implemented, without departing from the scope of the invention.

In this alternative embodiment, the tilting of each movable cowl 8*b* from its open position to its closed position automatically causes the introduction of the pin 52 into its associated orifice 68, possibly equipped with a bearing 74 intended to internally receive this same secondary shearing pin 52.

Finally, referring to FIGS. 5 and 11, it is noted that the attachment arrangement also comprise shearing pins 78 that are inactive in normal conditions of operation of the assembly. Two inactive pins 78 are, for example, provided, the first arranged in the plane P1 and the second in the plane P2. Each inactive pin 78 crosses a fitting 80 secured to the rigid structure, and a fitting 82 secured to the engine. The two pins 78 are preferentially arranged in a 12 o'clock position, under the central box 8a. These shearing pins 78 are axially oriented in the direction X. They are mounted with a radial play through at least one of the two corresponding orifices formed on the fittings 80, 82, and can thus ensure a so-called "fail safe" safety function in case of damage to the main shearing pins 50', 50". They can also allow a temporary fixing of the engine on the attachment strut, during the operations of mounting this engine on the primary structure.

In this respect, FIGS. 13a to 13e represent different steps of assembly of the engine assembly 5 described previously, and, in particular, that shown in FIGS. 5 and 9.

First of all, referring to FIG. 13a, the jet engine 10 is brought under the central box 8a with its movable structural cowls 8b in an open position. The suspension of the jet engine 10 under the central box 8a is ensured temporarily by the installation of the shearing pins 78 through the fittings 80, 82, as is schematically represented in FIG. 13b. Then, as schematically represented in FIG. 13c, the two top shearing pins 50' and the two secondary shearing pins 52 are installed in their orifices, in the top part of the engine assembly.

Figure 13D:
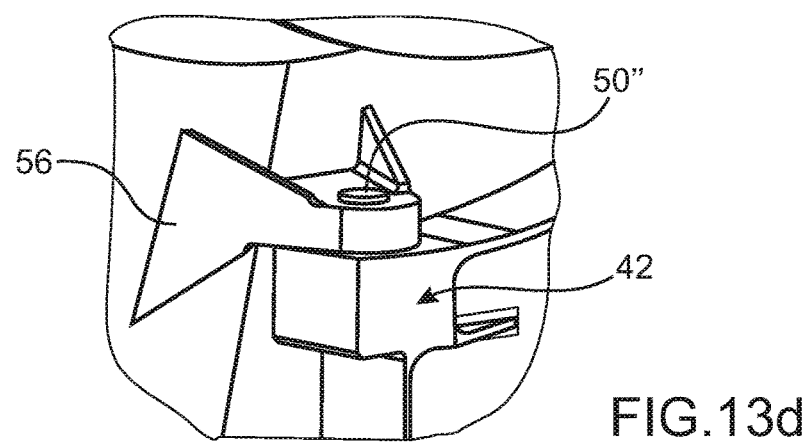

The mounting continues by installing the bottom shearing pin 50", through the fitting 56 and the front frame 42 of one of the movable cowls, as has been schematically represented in FIG. 13d. This mounting requires the movable cowls to be first brought to the closed position. Once all the pins 50', 50", 52 are installed, the pins 78 switch to inactive configuration.

Figure 13E:
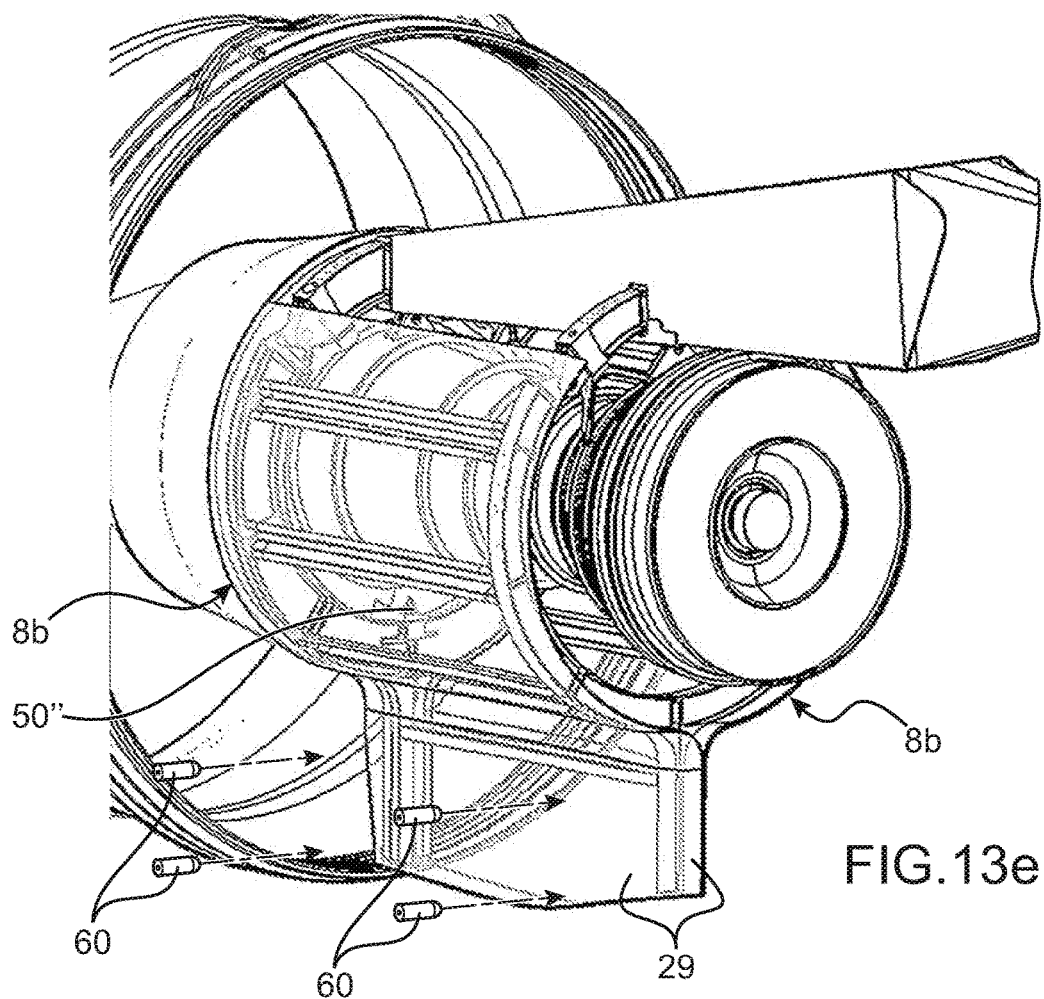

Finally, the assembly is completed by the installation of the removable fixing elements 60, this step being schematically represented in FIG. 13e. This final step comprises, in particular, in mounting the bolts 60 through the planar parts 29 of the distal ends of the two movable cowls 8b.

Obviously, various modifications can be made by a person skilled in the art to the invention which has just been described, solely as nonlimiting examples.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft engine assembly comprising:
a double-flow engine comprising an intermediate case comprising a hub, an outer shell and radial arms connecting the hub to the outer shell;
a device for attaching the engine to a structure of the aircraft, said attachment device comprising a primary structure equipped with a central box;
an arrangement to attach the engine to the primary structure of the attachment device;
wherein said primary structure also comprises two movable structural cowls each comprising an outer skin internally delimiting a secondary annular jet of the engine, each movable cowl comprising a proximal end articulated on a connecting structure connecting the movable cowl to the central box, and a distal end cooperating with the distal end of the other movable cowl, said movable structural cowls being laid out in continuity behind said intermediate case hub, and
wherein said attachment arrangement comprises a group of main ties laid out in a main transverse plane for absorbing forces crossing a front end of the movable structural cowls, said group of main ties comprising three main shearing pins radially oriented and distributed around a longitudinal axis of the engine, each main shearing pin crossing a first shearing orifice provided on a fitting secured to the hub of the intermediate case, and a second shearing orifice provided either on one of the movable cowls or on its connecting structure.

2. The engine assembly as claimed in claim 1, wherein each movable structural cowl comprises a front frame supporting the outer skin, and said second shearing orifice is located in the front frame.

3. The engine assembly as claimed in claim 1, wherein each connecting structure comprises a front framework protruding laterally from the central box, said second shearing orifice being located in said front framework.

4. The engine assembly as claimed in claim 3, wherein the two front frameworks, associated respectively with the two movable structural cowls, are secured to a transverse stiffening rib of the central box and produced of a single piece with this rib, the latter constituting a front closing rib of said central box.

5. The engine assembly as claimed in claim 1, wherein one of the three main shearing pins, called a bottom shearing pin, is arranged diametrically opposite relative to said central box, and in wherein the two other main shearing pins, called top shearing pins, are arranged symmetrically relative to a median plane of the engine assembly crossing the central box and the bottom shearing pin.

6. The engine assembly as claimed in claim 1, wherein the three main shearing pins are arranged substantially at 120° relative to one another.

7. The engine assembly as claimed in claim 1, wherein said attachment arrangement comprises a group of secondary ties laid out in a secondary transverse plane for absorbing forces crossing a rear end of the movable structural cowls, said group of secondary ties comprising two secondary shearing pins radially oriented and spaced apart circumferentially from one another, and wherein each secondary shearing pin crosses a third shearing orifice provided on a fitting secured to a case element of the engine, and a fourth shearing orifice provided on either one of the movable structural cowls or on its connecting structure.

8. The engine assembly as claimed in claim 7, wherein each movable structural cowl comprises a rear frame supporting the outer skin, and said fourth shearing orifice is located in the rear frame.

9. The engine assembly as claimed in claim 7, wherein each connecting structure comprises a rear framework protruding laterally from the central box, said fourth shearing orifice being located in said rear framework.

10. The engine assembly as claimed in claim 9, wherein the two rear frameworks, associated respectively with the two movable structural cowls, are secured to an inner stiffening transverse rib of the central box, and produced of a single piece with this inner rib.

11. The engine assembly as claimed in claim 7, wherein said fitting secured to the case element of the engine comprises two cross members, each oriented substantially tangentially relative to said case element, said fitting also comprising a plate toward which the two cross members converge, the secondary shearing pin cooperating with said plate.

12. The engine assembly as claimed in claim 1, wherein it comprises removable fixing elements ensuring the fixing, to one another, of the two distal ends of the movable structural cowls.

13. The engine assembly as claimed in claim 1, wherein said attachment elements also comprise shearing pins that are inactive in normal conditions of operation of the assembly.

14. The engine assembly as claimed in claim 1, wherein said attachment elements have no lateral links for absorbing thrust forces.

15. An aircraft comprising at least one engine assembly as claimed in claim 1, either fixed under a wing of this aircraft or onto the fuselage thereof.

* * * * *